(12) United States Patent
Bradshaw et al.

(10) Patent No.: US 9,656,809 B1
(45) Date of Patent: May 23, 2017

(54) BAR BELT WITH INTERDIGITIZED ELEMENTS

(71) Applicant: Agricultural Distributing, Inc., Woodland, CA (US)

(72) Inventors: Anthony J. Bradshaw, Woodland, CA (US); Daniel G. Mills, Acampo, CA (US)

(73) Assignee: Agricultural Distributing, Inc., Woodland, CA (US)

( * ) Notice: Subject to any disclaimer, the term of this patent is extended or adjusted under 35 U.S.C. 154(b) by 0 days.

(21) Appl. No.: 14/985,062

(22) Filed: Dec. 30, 2015

(51) Int. Cl.
*B65G 17/06* (2006.01)
*B65G 17/38* (2006.01)

(52) U.S. Cl.
CPC .................. *B65G 17/063* (2013.01)

(58) Field of Classification Search
CPC ................. B65G 17/06; B65G 17/38
USPC ..... 198/698, 844.1, 845, 848, 849, 850, 853
See application file for complete search history.

(56) References Cited

U.S. PATENT DOCUMENTS

| | | | |
|---|---|---|---|
| 1,817,037 A | 8/1931 | Mattison | |
| 2,310,646 A | 2/1943 | Morgan | |
| 2,571,955 A * | 10/1951 | Shields | B65H 5/028 198/731 |
| 2,915,204 A | 12/1959 | Alimanestiano | |
| 3,780,851 A * | 12/1973 | Bichel | B65G 19/22 198/730 |
| 4,023,671 A * | 5/1977 | Kramer | F16G 3/08 198/699 |
| 4,653,632 A * | 3/1987 | Timmer | A01D 17/10 198/822 |
| 4,815,587 A * | 3/1989 | Musil | B65G 15/52 198/728 |
| 4,832,183 A * | 5/1989 | Lapeyre | B65G 17/08 198/690.2 |
| 4,993,544 A | 2/1991 | Bailey et al. | |
| 5,377,819 A | 1/1995 | Horton et al. | |
| 6,106,391 A * | 8/2000 | Tjabringa | A01D 17/10 198/848 |
| 6,237,754 B1 * | 5/2001 | Tjabringa | B65G 15/52 198/803.14 |
| 6,966,435 B2 * | 11/2005 | Weiser | B65G 17/08 198/850 |
| 7,090,070 B2 * | 8/2006 | Linder | B65G 19/24 198/728 |
| 7,182,202 B2 * | 2/2007 | Kalverkamp | B65G 17/02 198/698 |

(Continued)

*Primary Examiner* — Douglas Hess
(74) *Attorney, Agent, or Firm* — R. Michael West (57) ABSTRACT

A conveyor belt comprised of a plurality of rigid, elongated bars arranged in parallel, spaced relation. The ends of each bar are connected to parallel, lateral belts, to support the bars and maintain their registration. Each bar has a plurality of elements, extending from either side of the bar. Elements on one side of a bar arranged in interdigitized relation with respect to adjacent elements extending from an adjacent bar. Rollers are provided within of the arcuate ends of the lateral belts, with at least one roller being driven. The rollers may be smooth or toothed, to engage the undersides of the lateral belts. The belt may be endless, or assembled from one or more belt segments. Two or more belts may be combined laterally, to increase the width of the conveyor belt.

19 Claims, 6 Drawing Sheets

(56) References Cited

U.S. PATENT DOCUMENTS

| | | | | |
|---|---|---|---|---|
| 7,360,643 B1* | 4/2008 | Fandella | ................ | B65G 17/08 198/321 |
| 7,473,168 B2* | 1/2009 | Day | ...................... | A01D 61/04 460/16 |
| 7,556,142 B2* | 7/2009 | Stebnicki | ............... | B65G 17/40 198/777 |
| 8,016,102 B2* | 9/2011 | Morris | .................. | B65G 19/08 198/698 |
| 9,033,139 B2* | 5/2015 | Jager | ..................... | B65G 15/48 198/850 |
| 9,073,694 B2* | 7/2015 | Ozaki | .................... | B65G 17/08 |
| 9,085,414 B2* | 7/2015 | Sharma | ................ | B65G 15/30 |

* cited by examiner

BAR BELT WITH INTERDIGITIZED ELEMENTS

BACKGROUND OF THE INVENTION

1. Field of the Invention

The invention relates generally to conveyor belts for transporting comestibles, products, and packages. More specifically, the invention pertains to a bar belt comprised of a plurality of rigid, elongated bars arranged in parallel relation and having their respective ends connected to lateral belts, each bar having elements extending from either side thereof, the elements being arranged in interdigitized relation with respect to adjacent elements from an adjacent bar.

2. Description of the Prior Art

Conveyor belts for transporting food, articles of manufacture, and packages are well known in the prior art. Conveyor belts have been manufactured from a variety of materials, including rubber, metal, and plastic, sometimes including individual components assembled to form a belt of the desired width and length. In some applications, conveyor belts are perforated, to allow debris to fall therethrough, providing a cleaning or a size-sorting function. Perforations are also useful to allow upflowing air or downflowing water to pass through the perforations and remove debris and dirt from the product stream. Belts may be inclined in strategic locations simply to transport objects to a higher or a lower elevation. Also, inclined belts may be combined with active cleaning forces, such as the pneumatic or hydraulic elements mentioned above.

By way of a more specific example, in U.S. Pat. No. 2,915,204, granted to Alimanestiano, a transfer device is disclosed. This device employs interdigitized fingers 23 and 23a, which are independently movable, both horizontally and vertically. These interdigitized fingers are used to transfer goods laterally, onto either of the load receiving zones 14.

Plastic modular conveyor belts and modules are shown in U.S. Pat. No. 4,993,544, issued to Bailey et al. Individual plastic modules have fingers which are interdigitized with those of an adjacent module. The fingers are also mechanically interconnected to fingers of an adjacent module by means of a pivot rod extending through an aperture in each of the fingers.

In U.S. Pat. No. 5,377,819, issued to Horton et al., a conveyor apparatus and a method are taught. The conveyor is comprised of a plurality of high friction plastic modules 200 and a plurality of low friction plastic modules 300. The goods being transported rest on the modules 200, and the modules 300 slide over wear strips 600. The fingers extending from these modules have holes, through which pivoting rods 602 pass.

A conveyor pad construction is illustrated in U.S. Pat. No. 1,817,037, granted to Mattison. In this arrangement, a traveling bed is adapted to receive a plurality of individual pads which comprise the load bearing or contact surface of the conveyor. The traveling bed includes a pair of heavy endless chains having links 10 affixed to each cross bar 12 by means of bolts 11.

U.S. Pat. No. 2,310,646 was granted to Morgan, for an endless conveyor. This conveyor uses a pair of "endless cables 8", providing drive and support for the belt 1. A plurality of brackets 3 is used to interconnect the belt 1 with the cables 8.

SUMMARY OF THE INVENTION

A conveyor belt is disclosed herein, comprising a plurality of rigid, elongated, modular bars arranged in parallel, spaced relation. The ends of each bar are affixed to the upper sides of parallel, lateral belts, to support the bars and to maintain both their lateral registration and their parallel registration.

Rollers are provided within the arcuate ends of the lateral belts to support and drive the conveyor belt for movement in a desired direction. Intermediate rollers may also be included along the length of the conveyor belt, to provide additional support for the belt and the articles being transported thereon. At least one of the rollers is driven, employing frictional or toothed engagement with the undersides of the lateral belts.

Each modular bar has a plurality of finger-like elements, spaced along and extending perpendicularly from opposing sides of the bar. The elements may be integrally stamped or molded with the bar when it is manufactured, or the elements may later be affixed to the bar, for example, by welding or through the use of mechanical fasteners.

In one embodiment of the invention, respective elements on opposing sides of each bar are in axial alignment with each other. Adjacent bars are then arranged in longitudinally offset relation from each other, so that elements on one side of a bar are respectively interdigitized with respect to adjacent elements extending from an adjacent bar. This embodiment requires two different types of bars, with their respective elements in axial alignment on each bar, but offset in their longitudinal positions along each type of bar.

In another embodiment of the invention, respective elements on opposing sides of each bar are spaced along the bar in longitudinally offset relation. Adjacent bars are then arranged in parallel relation, with adjacent elements on one side of a bar respectively interdigitized with respective elements extending from one side of an adjacent bar. This embodiment uses only a single type of bar, with their elements identically arranged in offset relation.

The dimensions and spacing of the bars and their elements are predetermined to support the articles, goods, or comestibles being transported. The dimensions and spacing of the bars and their elements may also be selected to perform a debris removal or a size sorting function. For example, when transporting comestibles, such as nuts, the open spaces or apertures between adjacent elements and between elements and the bars is selected to allow downward passage of debris such as rocks, twigs, dust, and dirt clods through the conveyor belt. This same open grid arrangement may be used advantageously to perform a size sorting function, allowing nuts or other comestibles which have not reached a certain size to be eliminated from the product stream, by allowing them to pass onto the ground.

The conveyor belt may be endless in construction, or it may be assembled from two or more discrete belt segments attached end-to-end to form a conveyor belt of the desired length. In addition, two or more belts may be combined laterally, to provide a conveyor belt of increased width. In that event, the structure would comprise two lateral belts, one on either side of the conveyor belt, and one or more intermediate belts, to which the inner ends of the bars are connected.

Repairs to the conveyor belt are readily made, owing to the modular nature of the bars and their means of attachment to the lateral belts and to intermediate belts, if applicable. In other words, replacement of a damaged bar is readily made by detaching each end of the bar from the lateral belts and the intermediate belts, removing the damaged bar, and then reversing the process to mount a new identical bar.

Modifying or converting the conveyor belt to carry larger or smaller articles, or to perform a different size sorting function, may be accomplished by removing all of the modular bars on the conveyor belt, and then replacing them with modular bars having the desired physical characteristics.

Those desired physical characteristics may include elements of different widths, lengths, or location, and bars having different diameters and lengths. In addition, the locations of mounting the bars along the lateral belts may be changed at the same time.

Modifications and changes of these types are calculated to change the features and characteristics of the open grid defined by the elements and bars comprising the conveyor belt.

DETAILED DESCRIPTION OF THE PREFERRED EMBODIMENT

Turning now to the drawings, a conveying and support surface 10 for a conveyor belt 11 comprises at least two rigid, elongated conveyor bars 12 arranged in parallel, spaced relation. Each bar 12 has ends 13 and opposing side portions 14 extending between ends 13. Each bar 12 further includes a plurality of finger-like, elongated elements 16. Each element 16 has an elongated axis 17 preferably extending perpendicularly from opposing side portions 14 of bar 12. Elements 16 are arranged in spaced relation along side portions 14 of bar 12, as explained in more detail below.

Each bar 12 also includes connector means 18 on its ends 13, such as a bore with an associated rivet. Structural equivalents to these connector means 18 would include detachable fasteners such as bolts and nuts, clamps, and receiver sleeves, but more permanent connector means including adhesives, welding, and crimping may be desirable in certain arrangements.

It is a significant feature of the conveyor belt 11, that the elements 16 extending from side portion 14 of a first bar 12 are arranged in interdigitized relation with respect to elements 16 extending from a side portion 14 of a second bar 12. The outer ends of elements 16 are also spaced from a side portion 14 of an adjacent bar 12. In this manner, elongated bars 12 and elements 16 define a grid forming the conveying and support surface 10. The grid has at least one aperture 19, and preferably a plurality of apertures 19, with a predetermined first minimum dimension 21, generally within the range of 5/16" to 1½". This first minimum dimension 21 is calculated to be smaller than a second minimum dimension 22 for articles such as comestibles 23, to be conveyed and supported on the conveyor belt 11.

However, first minimum dimension 21 for apertures 19 is still large enough to allow debris 20, such as twigs, dirt clods, rocks, and dust, to pass therethrough. Besides performing a cleaning function for the product stream, apertures 19 also perform a sizing function, by allowing undersized and unmarketable comestibles 23 to pass through the conveyor belt 11 onto the ground below.

In one embodiment of the conveyor belt 11, elements 16 on opposing side portions 14 are arranged in respective pairs, with the elongated axes 17 of a pair of elements 16 in alignment. This construction is shown in the individual conveyor bars 12, depicted in FIGS. 1 and 2, and in the assembly of a plurality of such bars 12 illustrated in the conveyor belt 11, shown in FIGS. 7, 8 and 9. To achieve an interdigitized relation between and among the elements 16, adjacent bars 12 must be longitudinally offset by shifting the position of the elements 16 on alternating ones of the bars 12. This is evident in FIGS. 7, 8, and 9, through a close examination of the differences between adjacent bars 12.

Figure 6:
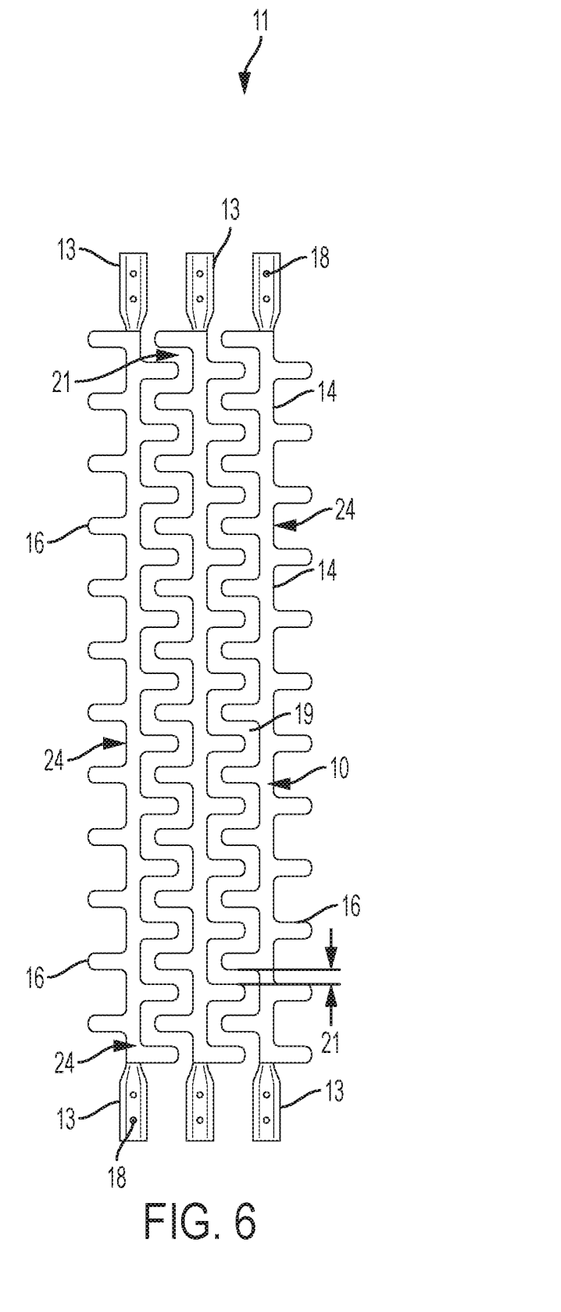
FIG. 6 is a top plan of three conveyor bars arranged in parallel relation, each including elements along opposing sides arranged in longitudinally offset relation and interdigitized with elements of an adjacent conveyor bar.

In another embodiment of the conveyor belt 11, elements 16 on opposing said side portions 14 are arranged in longitudinally offset and alternating relation along opposing side portions 14 of conveyor bars 24. This construction is shown in the assembly of three such conveyor bars 24 in FIG. 6, comprising a fragmentary portion of the conveyor belt 11. It should be noted that in this embodiment, all of the bars 24 are identical in structure, as the offset feature for the elements 16 is provided in the placement of the elements 16 on both side portions 14 of the bars 24.

Figure 3:
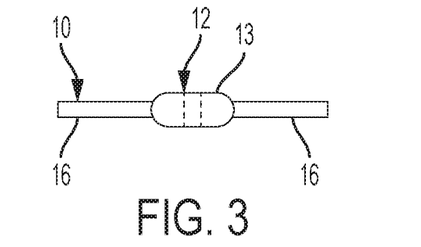
FIG. 3 is an end elevational view of the conveyor bar shown in FIG. 1, taken to an enlarged scale, showing the elements attached at an intermediate location along the side portions of the conveyor bar.
Figure 4:
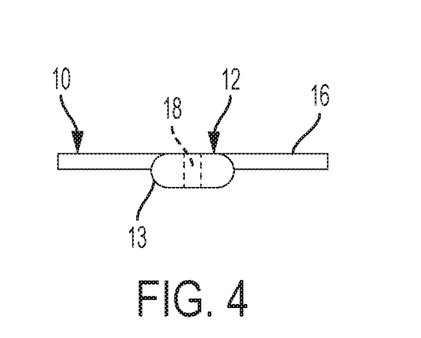
FIG. 4 is an end elevational view of an alternative construction for the conveyor bar, taken to an enlarged scale, showing the elements attached to the top sides of the conveyor bar.
Figure 5:
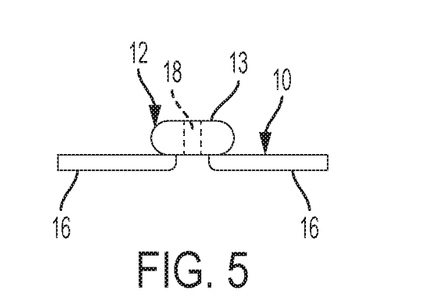
FIG. 5 is an end elevational view of another construction for the conveyor bar, taken to an enlarged scale, showing the elements attached to the bottom sides of the conveyor bar.

Yet another variation exists in the placement of the elements 16 on the opposing side portions 14 of the conveyor bars 12 and 24. In FIGS. 3, 4, and 5, three different placements are shown for elements 16. The first placement for element 16 is in the middle of the side portions 14. (See, FIG. 3). In this construction, if the articles being transported are relatively small, they will primarily lie upon the elements 16, and the bar 12 will act to some extent as a flight to assist conveyance of the articles. If the articles are relatively large, and have a flat bottom, they will rest primarily upon the bars 12.

Figure 1:
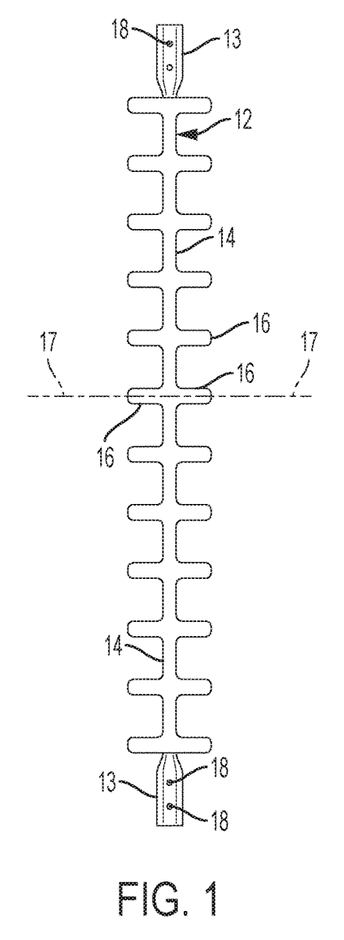
FIG. 1 is a top plan view of a conveyor bar, including elements on opposing sides which are arranged in axial alignment.
Figure 2:
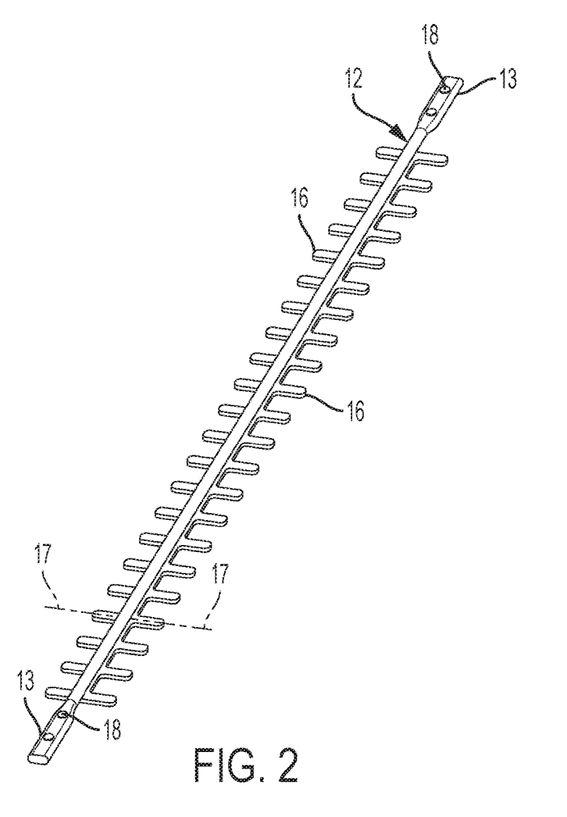
FIG. 2 is a perspective view of a conveyor bar similar to that shown in FIG. 1, but longer in length and including more elements having a different spacing.

In the second version of the element placement, shown in FIG. 4, the upper surfaces of the elements 16 are co-planar with the upper surfaces of the bars 12 (or bars 24). Top plan views of elements 16 so arranged, are shown in FIG. 1 and in FIG. 6. This construction will be most useful for transporting large boxes or packages, which will be stable on the planar conveying and support surface 10.

The third version of element placement locates the elements 16 on the underside of the bars 12 (or bars 24). As shown in FIG. 5, this construction creates even a greater elevation difference between the upper surfaces of the elements 16 and the bars 12, enhancing the ability of the bars 12 to act as flights. This may be useful to control the articles being conveyed where the conveyor belt 11 is moving in an inclined fashion.

Figure 9:
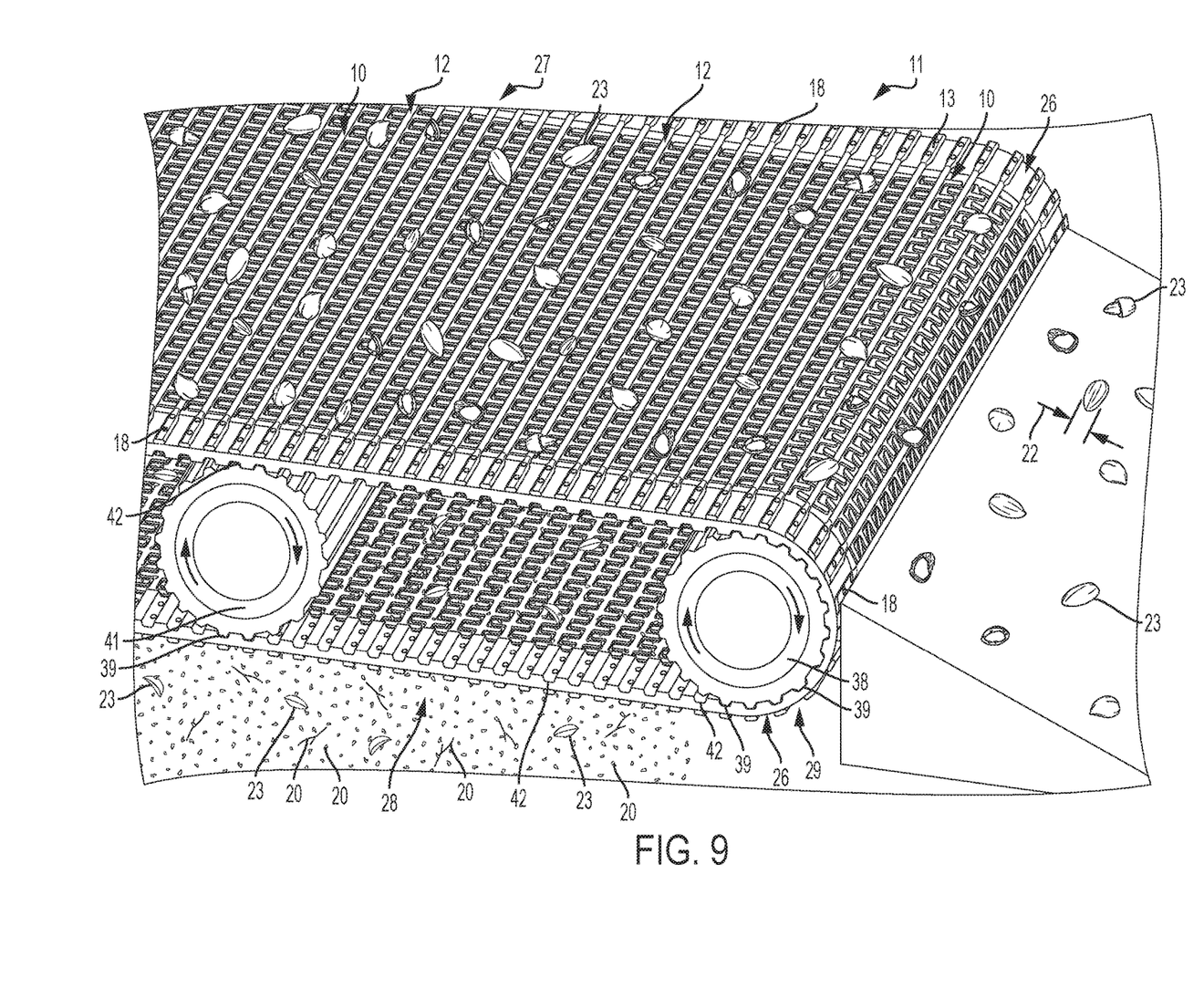
FIG. 9 is a perspective view of a discharge end portion of a single width conveyor belt driven by toothed rollers, showing comestibles being supported and transported on the upper surface of the conveyor belt and debris falling therethrough; and, FIG. 10 is a side elevational view of a conveyor belt driven by cylindrical rollers with smooth surfaces, showing packages being supported and transported on the upper conveying and support surface of the conveyor belt.

The conveyor belt 11 also includes a pair of opposing and parallel lateral belts 26, spaced from each other to define a width for the conveyor belt 11. Lateral belts 26 are flexible, preferably being constructed from a reinforced rubber material. However, lateral belts 26 could also be constructed from plastic, wire mesh, or chain material. The plurality of elongated bars 12 transversely span the lateral belts 26. The bars 12 are also arranged in parallel, spaced relation, as shown in FIG. 9. The connector means 18 on ends 13 of the elongated bars 12 are connected to the lateral belts 26, to maintain the proper lateral and parallel relation of bars 12. This ensures that the elements 16 extending from a side portion 14 of each bar 12 are maintained in interdigitized relation with respect to elements 16 extending from a side portion 14 of an adjacent bar 12.

Figure 10:
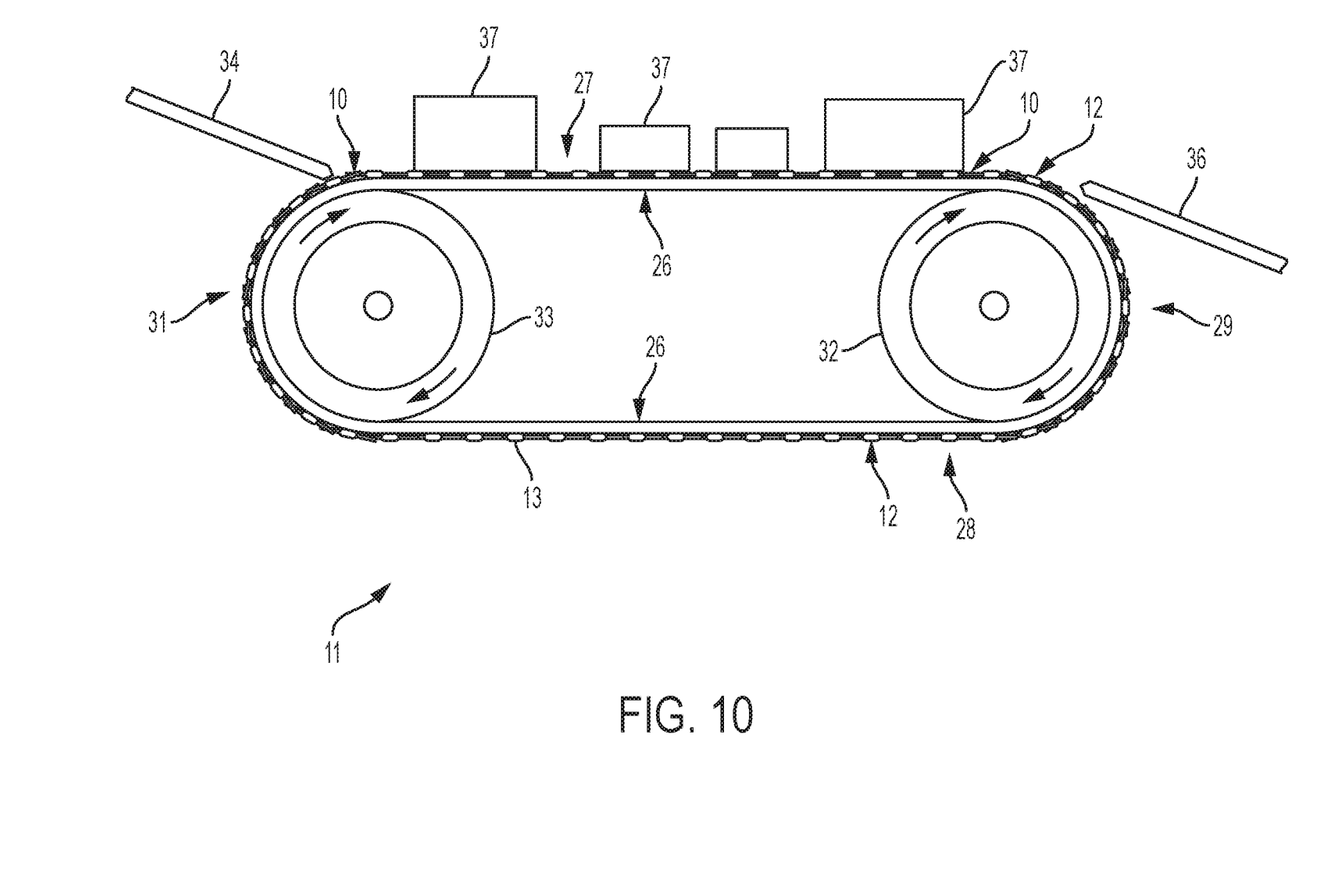

Conveyor belt 11 includes an upper run 27 and a lower run 28, having a first arcuate end 29 and a second arcuate end 31 therebetween. A first roller 32 is provided within the first arcuate end 29, and a second roller 33 provided within the second arcuate end 31 (See, FIG. 10). First roller 32 and second roller 33 may be provided with a smooth outer periphery, as shown in FIG. 10. In that case, lateral belts 26 will be provided with a smooth underside surface for frictional engagement with the outer peripheries of the first roller 32 and the second roller 33.

Preferably, at least one of the rollers 32 or 33 is rotationally driven, to impart movement of the conveyor 11 in the desired direction. Since elements 16 extending from adjacent bars 12 are interdigitized, but not in contact with each other or with an adjacent bar, a smooth rotational transition of the conveyor belt 11 around first arcuate end 29 and second arcuate end 31 is provided, with no mechanical interference.

An inclined input ramp 34 is provided at the incoming end of the upper run 27 of the conveyor 11, and an inclined output ramp 36 is provided at the outgoing end of the upper run 27 of the conveyor 11. Articles such as boxes 37 slide down the input ramp 34 onto the upper run 27, are transported along the extent of the upper run 27, and then slide down the output ramp 36 for further processing and handling.

Figure 8:
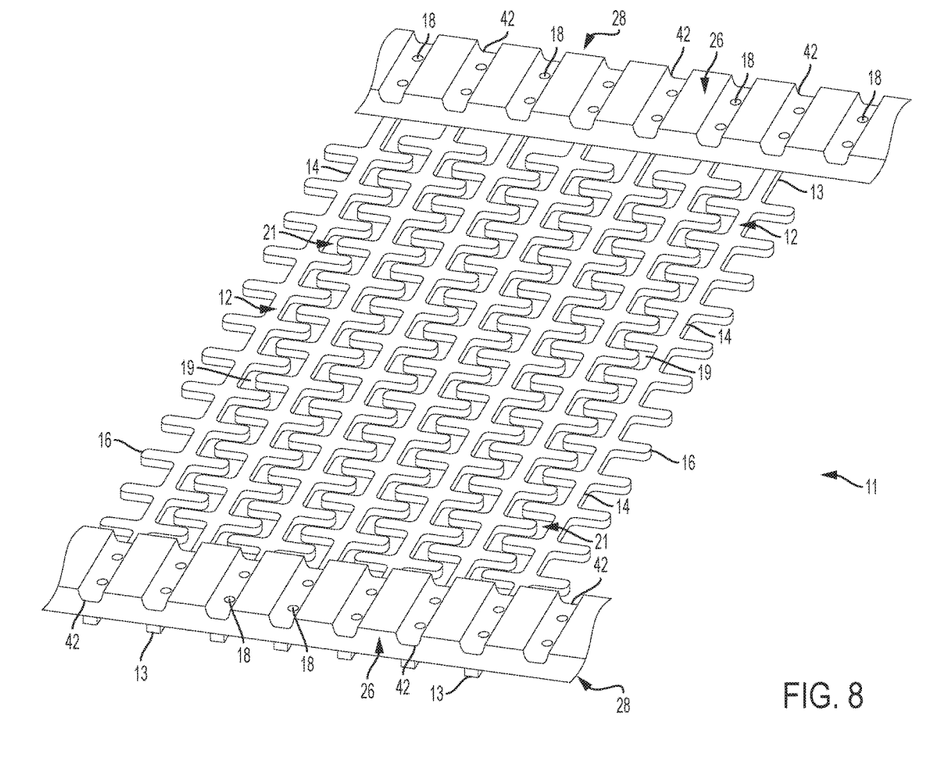
FIG. 8 is perspective view of the lower surface of a portion of a single width conveyor belt, showing the plurality of spaced drive tooth recesses in the lateral belts.

In an alternative roller and belt arrangement, a first roller 38 may be provided with a plurality of peripheral outer teeth 39, as shown in FIG. 9. Likewise, an identical second roller (not shown) is also provided with peripheral outer teeth 39. For the purpose of providing additional support or drive for the conveyor belt 11, at least one intermediate roller 41 may also be included between the first roller and the second roller. It may be desirable to provide a plurality of intermediate rollers 41 which are smaller than the first and second rollers, and which only come into contact with the underside of upper run 27 of conveyor belt 11. Intermediate roller 41 is also provided with peripheral outer teeth 39. Making particular reference to FIG. 8, the undersides of lateral belts 26 include a plurality of spaced recesses 42, which are located, sized, and configured to be engaged by outer teeth 39. FIG. 8 also illustrates how the connector means 18 for the bars 12 may be located within recesses 42.

Figure 7:
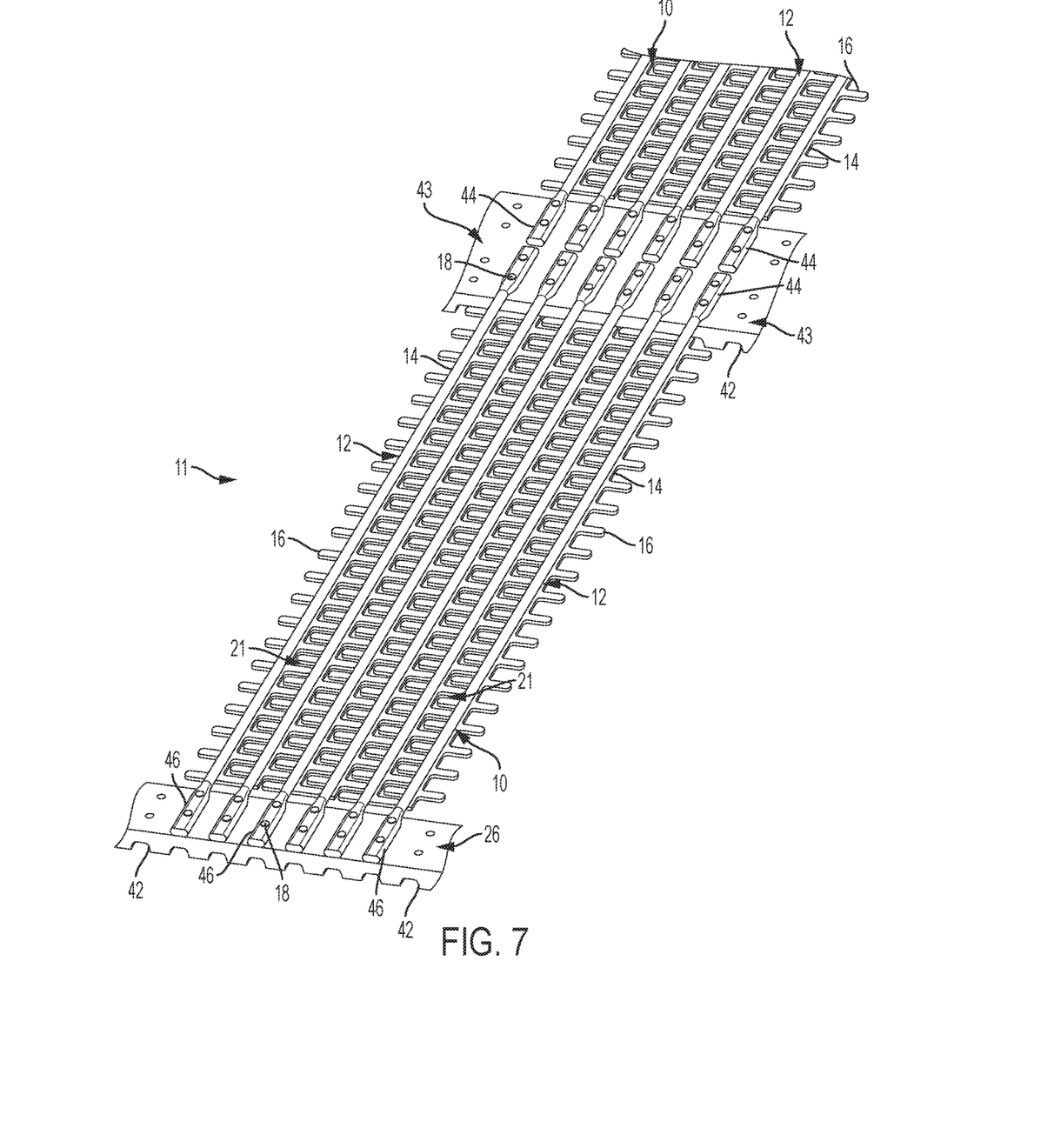
FIG. 7 is a perspective view of the upper surface of a portion of a double width conveyor belt, showing a lateral belt and an intermediate belt, with a portion of the upper width of the conveyor belt being deleted for clarity to maintain the scale of the drawing, the upper width of the conveyor belt being a mirror image of the lower width of the conveyor belt.

Yet another variation of the conveyor belt 11 is illustrated in FIG. 7. For the purpose of providing a wider conveyor belt, a first plurality of bars 12, a second plurality of bars 12, and at least one intermediate belt 43 between lateral belts 26 are provided. In this arrangement, the ends of the first plurality of bars and the second plurality of bars include inner ends 44 and outer ends 46. The outer ends 46 of the first and second plurality of bars 12 are connected to the upper sides of a respective lateral belt 26, and the inner ends of the first and second plurality of bars 12 are connected to a respective side portion of the upper side of intermediate belt 43. Additional intermediate belts 43 may be included, along with additional bars 12, to assemble a conveyor belt 11 of the desired width. First roller 32 and second roller 33, along with any intermediate roller 41, are extended appropriately, to accommodate the additional width such a conveyor belt 11.

What is claimed is:

1. A conveying and support surface for a conveyor belt comprising,
    at least two rigid, elongated bars arranged in parallel, spaced relation, each of said bars having ends and opposing side portions extending between said ends, each of said bars further including a plurality of elongated elements, each of said elements having an elongated axis extending perpendicularly from opposing side portions of said bar and being arranged in spaced relation therealong, each bar further having connector means on each of said ends, and in which said elements extending from a side portion of a first of said bars are arranged in interdigitized relation with respect to said elements extending from a side portion of a second of said bars; and,
    a pair of opposing and parallel lateral belts, said lateral belts being spaced from each other to define a conveyor belt width, and in which said at least two elongated bars transversely span said lateral belts, with respective said connector means on said ends of said elongated bars being connected to said lateral belts.

2. A conveying and support surface as in claim 1 in which said elements on opposing said side portions are arranged in respective pairs, and in which elongated axes of a respective said element pair are in alignment.

3. A conveying and support surface as in claim 1 in which said elements on opposing said side portions are arranged in longitudinally offset and alternating relation along said opposing said side portions.

4. A conveying and support surface as in claim 1 in which said elongated bars and said elements define a grid surface, said grid surface having at least one aperture with a predetermined first minimum dimension, said first minimum dimension calculated to be smaller than a second minimum dimension for articles to be supported and carried on the conveyor belt.

5. A conveyor belt, comprising:
    a. a plurality of rigid, elongated bars, each of said bars having ends and opposing side portions extending between said ends, each of said bars further including a plurality of elongated elements, each of said elements having an elongated axis extending perpendicularly from opposing side portions of said bar and being arranged in spaced relation therealong, each bar further having connector means on each of said ends; and,
    b. a pair of opposing and parallel lateral belts, said lateral belts being spaced from each other to define a conveyor belt width, and in which said plurality of elongated bars transversely span said lateral belts, said elongated bars being arranged in parallel, spaced relation, with respective said connector means on said ends of said elongated bars being connected to said lateral belts, and in which said elements extending from a side portion of a each of said bars are arranged in interdigitized relation with respect to said elements extending from a side portion of an adjacent said bar.

6. A conveyor belt as in claim 5, in which said elements on opposing said side portions of said elongated bars are arranged in respective pairs, and in which elongated axes of a respective said element pair are in alignment.

7. A conveyor belt as in claim 5, in which said elements on opposing said side portions of said elongated bars are arranged in longitudinally offset and alternating relation along said opposing said side portions.

8. A conveyor belt as in claim 5 in which said elongated bars and said elements define a grid surface, said grid surface having at least one aperture with a predetermined first minimum dimension, said first minimum dimension calculated to be smaller than a second minimum dimension for articles to be supported and carried on the conveyor belt.

9. A conveyor belt as in claim 5 in which said plurality of bars and said lateral belts define an upper run and a lower run of the conveyor belt with a first arcuate end and a second arcuate end therebetween, and in which a first roller is provided within said first arcuate end and a second roller is provided within said second arcuate end.

10. A conveyor belt as in claim 9 in which said first roller and said second roller have peripheral outer teeth and in which said lateral belts have an underside provided with recesses sized and configured to be engaged by said outer teeth.

11. A conveyor belt as in claim 9 in which said first roller and said second roller have a smooth outer periphery, and in which said lateral belts have a smooth underside for frictional engagement by said outer periphery of said first and second rollers.

12. A conveyor belt as in claim 9 in which either said first roller or said second roller is rotationally driven.

13. A conveyor belt as in claim 9 including an intermediate roller, between said first roller and said second roller, said intermediate roller being in contact with an underside of said lateral belts within said upper run.

14. A conveyor belt as in claim 5 further including a first plurality of said bars and a second plurality of said bars and at least one intermediate belt between said lateral belts, and in which said ends of said first plurality of bars and said second plurality of bars include inner ends and outer ends, said outer ends of said first and second plurality of bars being connected to a respective lateral belt and said inner ends of said first and second plurality of bars being connected to a respective side portion of said intermediate belt.

15. A conveyor belt as in claim 5 in which said plurality of elongated elements is mounted to an upper side portion of said bars, and in which said elements and said bars have upper surfaces which are co-planar.

16. An endless conveyor belt, comprising:
   a plurality of rigid, elongated bars, each of said bars having ends and opposing side portions extending between said ends, each of said bars further including a plurality of elongated elements, each of said elements having an elongated axis extending perpendicularly from opposing side portions of said bar and being arranged in spaced relation therealong, each bar further having connector means on each of said ends,
   a pair of opposing and parallel lateral belts, said lateral belts being spaced from each other to define a conveyor belt width, and in which said plurality of elongated bars transversely span said lateral belts, said elongated bars being arranged in parallel, spaced relation, with respective said connector means on said ends of said elongated bars being connected to said lateral belts, and in which said elements extending from a side portion of a each of said bars are arranged in interdigitized relation with respect to said elements extending from a side portion of an adjacent said bar,
   said plurality of said bars and said pair of lateral belts defining an endless conveyor belt having upper run and a lower run, and a first arcuate end and a second arcuate end therebetween.

17. An endless conveyor belt as in claim 16 in which a first roller is provided within said first arcuate end and a second roller is provided within said second arcuate end.

18. An endless conveyor belt as in claim 17 in which either said first roller or said second roller is rotationally driven.

19. A conveyor belt as in claim 16 further including a first plurality of said bars and a second plurality of said bars and at least one intermediate belt between said lateral belts, and in which said ends of said first plurality of bars and said second plurality of bars include inner ends and outer ends, said outer ends of said first and second plurality of bars being connected to a respective lateral belt and said inner ends of said first and second plurality of bars being connected to a respective side portion of said intermediate belt.

* * * * *